(12) United States Patent
Swaine (10) Patent No.: US 11,755,497 B2
(45) Date of Patent: Sep. 12, 2023

(54) MEMORY MANAGEMENT

(71) Applicant: Arm Limited, Cambridge (GB)

(72) Inventor: Andrew Brookfield Swaine, Sheffield (GB)

(73) Assignee: Arm Limited, Cambridge (GB)

( * ) Notice: Subject to any disclaimer, the term of this patent is extended or adjusted under 35 U.S.C. 154(b) by 1 day.

(21) Appl. No.: 17/197,425

(22) Filed: Mar. 10, 2021

(65) Prior Publication Data

US 2021/0303478 A1 Sep. 30, 2021

(30) Foreign Application Priority Data

Mar. 24, 2020 (GB) ..................................... 2004256

(51) Int. Cl.
*G06F 12/1027* (2016.01)
(52) U.S. Cl.
CPC ...... *G06F 12/1027* (2013.01); *G06F 2212/45* (2013.01)
(58) Field of Classification Search
None
See application file for complete search history.

(56) References Cited

U.S. PATENT DOCUMENTS

| | | | | |
|---|---|---|---|---|
| 2002/0161976 | A1* | 10/2002 | Ito | G06F 12/0864 711/140 |
| 2010/0268892 | A1* | 10/2010 | Luttrell | G06F 12/0862 711/E12.001 |
| 2018/0004678 | A1* | 1/2018 | Bogusz | G06F 12/0215 |
| 2018/0011651 | A1 | 1/2018 | Sankaran et al. | |
| 2018/0329821 | A1* | 11/2018 | Brekelbaum | G06F 13/16 |
| 2019/0095343 | A1* | 3/2019 | Gopal | G06F 12/1027 |
| 2020/0065257 | A1 | 2/2020 | Ghiggini et al. | |
| 2020/0192817 | A1* | 6/2020 | Campbell | G06F 9/3806 |
| 2021/0149806 | A1* | 5/2021 | Shi | G06F 12/0877 |

OTHER PUBLICATIONS

Combined Search and Examination Report for GB2004256.0, dated Nov. 26, 2020, 9 pages.

* cited by examiner

*Primary Examiner* — Stephanie Wu (74) *Attorney, Agent, or Firm* — NIXON & VANDERHYE P.C.

(57) ABSTRACT

Memory management apparatus comprises input circuitry to receive a translation request defining a first memory address within a first memory address space; prediction circuitry to generate a predicted second memory address within a second memory address space as a predicted translation of the first memory address, the predicted second memory address being a predetermined function of the first memory address; control circuitry to initiate processing of the predicted second memory address; translation and permission circuitry to perform an operation to generate a translated second memory address for the first memory address associated with permission information to indicate whether memory access is permitted to the translated second memory address; and output circuitry to provide the translated second memory address as a response to the translation request when the permission information indicates that access is permitted to the translated second memory address.

17 Claims, 7 Drawing Sheets

MEMORY MANAGEMENT

This application claims priority to GB Patent Application No. 2004256.0 filed 24 Mar. 2020, the entire contents of which is hereby incorporated by reference.

BACKGROUND

This disclosure relates to memory management.

A data processing apparatus may provide each running program or peripheral device with access to a virtual address space defined by virtual memory addresses. Each program or device sees its own virtual address space which contains instructions and data for use by that program or device. Amongst other established advantages, the use of virtual addressing allows the operating system to control memory access by inhibiting one program from accessing or corrupting information used by another program.

When an access is required to a virtual memory address, it is first necessary to translate the virtual memory address to a physical memory address so that the required information can be obtained from or written to the physical memory or a physical memory cache.

A cache known as a translation lookaside buffer (TLB) may be used as part of the address translation process. The TLB stores recently or commonly used translations between virtual and physical memory addresses. So, as a first step in an address translation process, a TLB may be consulted to detect whether the TLB already contains the required address translation. If not, then a more involved translation process may be used, for example involving consulting so-called page tables holding address translation information, typically resulting in the TLB being populated with the required translation.

Multiple stage translation is used in some situations. In examples, two levels of translation are used. A virtual address (VA) required by an executing program or other system module such as a graphics processing unit (GPU) is translated to an intermediate physical address (IPA) by a first translation stage. The IPA is translated to a physical address (PA) by a second translation stage. One reason why multiple stage translation is used is for security of information handling when multiple operating systems (OS) may be in use on respective "virtual machines" running on the same processor. A particular OS is exposed to the VA to IPA translation, whereas only a hypervisor (software which oversees the running of the virtual machines) or other supervisory process has oversight of the stage 2 (IPA to PA) translation.

Memory address translation may be associated with a detection of permission information indicating whether access is permitted to the translated memory address.

SUMMARY

In an example arrangement there is provided memory management apparatus comprising:

input circuitry to receive a translation request defining a first memory address within a first memory address space;

prediction circuitry to generate a predicted second memory address within a second memory address space as a predicted translation of the first memory address, the predicted second memory address being a predetermined function of the first memory address;

control circuitry to initiate processing of the predicted second memory address;

translation and permission circuitry to perform an operation to generate a translated second memory address for the first memory address associated with permission information to indicate whether memory access is permitted to the translated second memory address; and output circuitry to provide the translated second memory address as a response to the translation request when the permission information indicates that access is permitted to the translated second memory address.

In another example arrangement there is provided a method comprising:

receiving a translation request defining a first memory address within a first memory address space;

generating a predicted second memory address within a second memory address space as a predicted translation of the first memory address, the predicted second memory address being a predetermined function of the first memory address;

initiating processing of the predicted second memory address;

performing an operation to generate a translated second memory address for the first memory address associated with permission information to indicate whether memory access is permitted to the translated second memory address; and providing the translated second memory address as a response to the translation request when the permission information indicates that access is permitted to the translated second memory address.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

An example embodiment provides memory management apparatus comprising:

input circuitry to receive a translation request defining a first memory address within a first memory address space;

prediction circuitry to generate a predicted second memory address within a second memory address space as a predicted translation of the first memory address, the predicted second memory address being a predetermined function of the first memory address;

control circuitry to initiate processing of the predicted second memory address;

translation and permission circuitry to perform an operation to generate a translated second memory address for the first memory address associated with permission information to indicate whether memory access is permitted to the translated second memory address; and output circuitry to provide the translated second memory address as a response to the translation request when the permission information indicates that access is permitted to the translated second memory address.

The example embodiments allow a potential performance improvement by allowing the further processing of a predicted version of a translated address to be initiated, for example on a speculative basis before the actual translated address and associated permission information are established by translation and permission circuitry. This way, at least some of the further processing tasks such as prefetching can be performed so as to potentially speed up a subsequent fetch or other process.

The processing initiated by the control circuitry may be, for example, processing relating to a subsequent translation or permission stage of a memory management unit, but in examples the control circuitry is configured to initiate prefetching of data at the predicted second memory address. As discussed above this can potentially provide a performance improvement by initiating the prefetching of data which will be retrieved assuming that the predicted translation is correct and the permission information allows it. Such a subsequent retrieval operation may therefore be faster by virtue of prefetching having been initiated in this way.

Although the further processing may be initiated at any stage, in an arrangement in which the initiated processing is (or includes) prefetching, then a performance advantage may be obtained in an example arrangement in which the control circuitry is configured to initiate prefetching of data at the predicted second memory address before the completion of the operation performed by the translation and permission circuitry for the first memory address.

Although the arrangement is applicable to a single stage memory management apparatus, in example embodiments the apparatus comprises one or more successive address translation stages; and the translation and permission circuitry provides at least one of the one or more successive translation stages. For example, the translation and permission circuitry may provide at least a last stage of the one or more successive address translation stages; and the translated second memory address may represent a physical memory address. Indeed, in a multiple stage memory management arrangement, the apparatus may comprise further translation circuitry to generate the first memory address as a translation of a virtual memory address in a virtual memory address space, the first memory address being for example one of an intermediate physical address and a virtual memory address.

The prediction can be a prediction of a so-called identity translation, for example in which the predetermined function is such that the predicted second memory address is equal to the first memory address (in such cases, assuming that the prediction is correct the translation and permission circuitry may be viewed as performing a translation process but with the outcome of no net translation). However, other functions may be used such as an addition of an offset, a bit shift or the like. To implement the function, in examples the prediction circuitry comprises circuitry to apply the predetermined function to first memory addresses to generate corresponding predicted second memory addresses.

Various options are available as to whether or not prediction should be used (given that prediction and initiation of processing may use at least some processing resources and/or electrical energy). In some examples, a decision may be made on the basis of historical outcomes, in which the prediction circuitry is configured to generate the predicted second memory address as the predetermined function of the first memory address in dependence on whether one or more previous predicted second memory addresses were equal to the respective translated second memory addresses. This may be handled by context (address space identifier, virtual machine identifier or the like), in which the prediction circuitry is configured to generate the predicted second memory address as the predetermined function of the first memory address in dependence on whether one or more previous predicted second memory addresses were equal to the respective translated second memory addresses for a current translation context. To achieve this functionality the prediction circuitry may comprise a history memory to store data (generally, or by context) indicating, for one or more previous predicted second memory addresses, whether those one or more previous predicted second memory addresses were equal to the respective translated second memory addresses.

In other example arrangements, the prediction operation can be responsive to configuration settings, for example established by system software. In such examples, the prediction circuitry may be responsive to configuration data to selectively apply the predetermined function to first memory addresses to generate a corresponding predicted second memory address.

In other examples, the prediction can be carried out for every applicable first memory address.

Example embodiments can provide data processing apparatus comprising: one or more memories accessible according to physical memory addresses; one or more data processing nodes to generate translation requests from a virtual memory address generated by that data processing node to a physical memory address to access the one or more memories; memory management apparatus as defined above to translate a virtual address from a data processing node to a physical address to access the one or more memories; and prefetch circuitry to prefetch data from the one or more memories in response to initiation of prefetching by the control circuitry. The prefetch circuitry can act on the initiation of prefetches by the arrangements described above.

In example embodiments, a data store is associated with the prefetch circuitry. In order to handle prefetched data the data store may be configured to store data prefetched by the prefetch circuitry; the output circuitry may be configured to initiate a data retrieval operation at the translated second memory address; and the prefetch circuitry may be configured to provide the prefetched data from the data store as a response to the data retrieval operation. In other words, when the required data has already been prefetched and is held by the data store (such as a cache) it can be outputted from the data store when actually required as a fetch or data retrieval operation. In situations where it is not currently held by the data store, such as where a prefetch was not initiated or a prefetch was initiated but has not yet completed when the fetch is initiated, then either the cache can be populated and the data output by the cache, or the data can be provided directly from memory. In other words, in such examples, when the data retrieval operation is initiated before completion of a prefetch operation, the prefetch circuitry is configured not to store the retrieved data in the data store.

Because the prefetched data may have been obtained before the associated permission information, to avoid breaching the requirements of the permission data, in some examples the prefetch circuitry is configured to inhibit access to the prefetched data in the data store corresponding to given predicted second memory address unless a data retrieval operation is initiated for a translated second memory address equal to the predicted second memory address.

To avoid multiple potentially incorrect copies of a data item being retained, particularly in a coherent system, the prefetch circuitry may be configured to invalidate a copy of data stored in the data store for a given second memory address in response to initiation of an operation to write to the given second memory address.

As an example of a technique to maintain the data store, in some examples the prefetch circuitry is configured to evict from the data store any data retrieved from the data store in response to a data retrieval operation. In other examples, the data store may for example retain stored data until eviction is required to make space for data to be newly stored.

Another example embodiment provides a method comprising:

receiving a translation request defining a first memory address within a first memory address space;

generating a predicted second memory address within a second memory address space as a predicted translation of the first memory address, the predicted second memory address being a predetermined function of the first memory address;

initiating processing of the predicted second memory address;

performing an operation to generate a translated second memory address for the first memory address associated with permission information to indicate whether memory access is permitted to the translated second memory address; and providing the translated second memory address as a response to the translation request when the permission information indicates that access is permitted to the translated second memory address.

Overview of Apparatus

Figure 1:
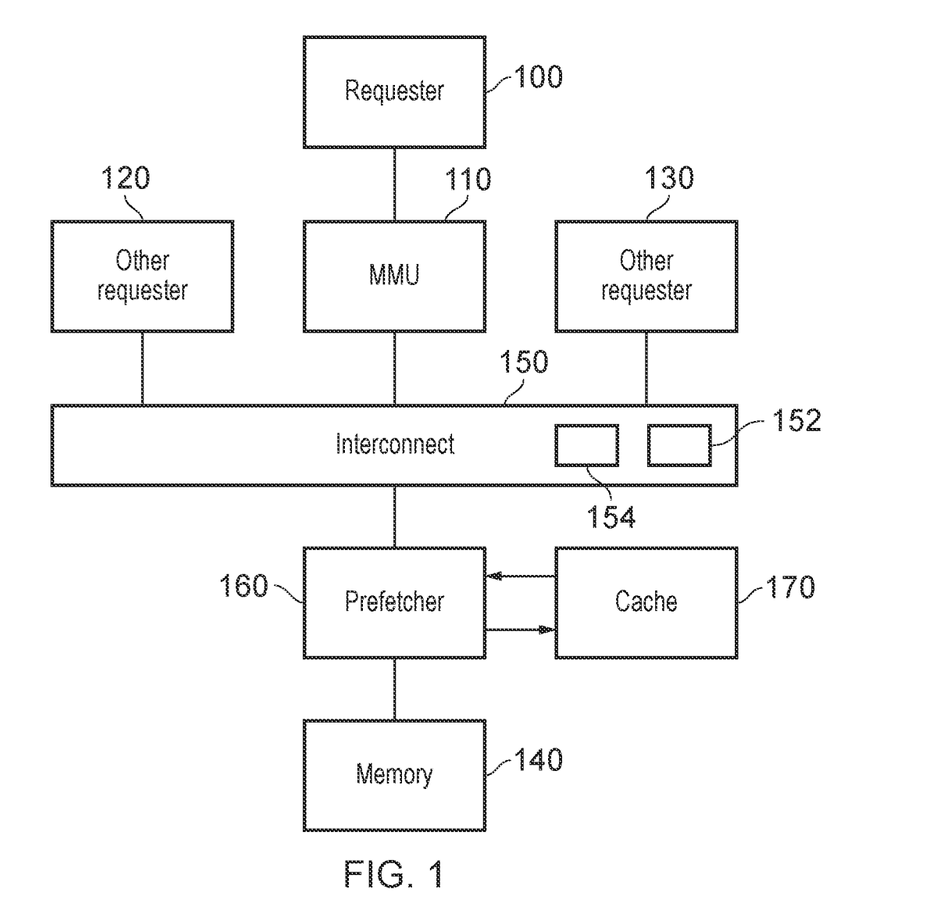
FIG. 1 schematically illustrates a data processing apparatus.

Referring now to the drawings, FIG. 1 schematically illustrates a data processing apparatus comprising a translation requester 100 such as a processor core (CPU or central processing unit), a media processor such as a graphics processing unit (GPU), a display processor, a peripheral device or the like. The translations are requested by the requester 100 as part of memory access transactions initiated by the requester 100.

The requester is associated with a memory management unit or apparatus (MMU) 110 which handles address translations and permission information for requests by the requester 100. Other requesters 120, 130 are shown schematically; these may share the MMU 110 or may have their own respective MMU functionality.

FIG. 1 also shows a memory 140 and an interconnect 150 connecting the various components. Other memories (not shown) may be provided, for example being connected to the interconnect 150, and/or the memory 140 may be embodied by multiple memory devices. A prefetcher 160 having an associated data store such as a cache memory 170 is also shown between the interconnect 150 and the memory 140. Note however that the prefetcher 160 functionality could alternatively be implemented as part of the functionality of the interconnect 150, the MMU 110, the memory 140 (or a memory controller forming part of the memory 140, not shown) or the like. Therefore, the position in the circuitry of the prefetcher 160 is purely a schematic example and is just chosen for clarity of the present description.

Two aspects of managing access to the memory 140 will now be discussed. (A third, data coherency, will be discussed below). These are the use of address translation and the use of memory protection.

Regarding address translation, as mentioned above, each running program or peripheral device may be provided with access to a virtual address space defined by virtual memory addresses, so that each program or device sees its own virtual address space which contains instructions and data for use by that program or device. When an access is required to a location represented by a virtual memory address, it is first necessary to translate the virtual memory address to a physical memory address so that the required information can be obtained from or written to the physical memory (such as the memory 140) or a physical memory cache.

Although single stage translation from a virtual address to a physical address may be used, multiple stage translation is used in some situations. In some examples, two levels of translation are used. A virtual address (VA) required by an executing program or other system module is translated to an intermediate physical address (IPA) by a first translation stage. The IPA is translated to a physical address (PA) by a second translation stage.

Address translation can be used in respect of accesses originating at each data processing node or other connected device to the memory 140.

Another aspect is that of memory protection. Memory protection can be used to police access to portions of the memory address space. Although a separate memory protection unit (MPU) could be disposed between the interconnect 150 and the memory 140, in the present examples memory protection functionality can be performed by the MMU 110. In doing this, the MMU may detect (in association with data defining an address translation) permission information indicating whether access (or a desired form of access such as a read and/or a write) is allowed to the translated address. Note that the permission information may in fact be organised so as to be associated with the address to be translated, but the net effect is that it defines whether access is permitted to the translated address. Another form of permission information is provided by the presence/absence of a valid address translation. If a valid address translation is not defined for a given address to be translated, then this is equivalent to a lack of permission for any access to a translated version of that given address.

Note that there is no requirement, either in the case of a single stage MMU or in respect of any one or more stages of a multiple stage MMU to be discussed below, that the translation process generates an outcome which is necessarily different to the input address provided to that stage or process. A "translation" or translation stage can represent an identity translation such that the output address is numerically the same as the input address.

The memory 140, which as mentioned above may be embodied as one or more physical memory devices, can store various types of data including, for example, program code for execution by the CPU, GPU or display processor, and media data such as video data. It may include a memory controller (not shown).

Overview of Prefetching

The prefetcher 160 is arranged to prefetch data from the memory 140. A prefetch operation does not actually return data to the requesting device (such as the requester 100) but carries out at least some initial stages of obtaining that data, for example going as far as storing a copy in the data store 170 which can then be (potentially more quickly) provided if and when a fetch or data retrieval operation is initiated.

In some examples, the provision of the data from the data store 170 in response to a data retrieval operation can initiate the deletion or eviction of that data from the data store 170, by the prefetch circuitry. In other examples, whether or not the data is output in response to a data retrieval operation, data in the data store 170 can be evicted as it ages, and space is required for other data to be written into the data store 170, for example according to an eviction policy which evicts the least recently used data from the data store when space is required. An alternative eviction policy is a random eviction policy.

Example MMU Techniques

Figure 2:
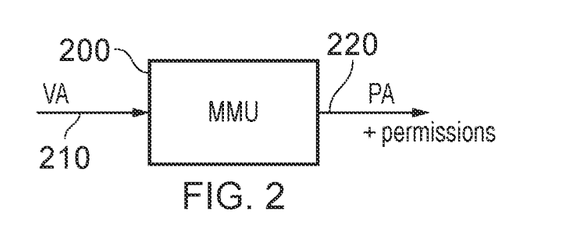
FIGS. 2 to 5 schematically illustrate respective examples of memory management techniques.

FIG. 2 schematically illustrates an example MMU 200, for example a single stage MMU in which an input virtual address (VA) 210 is translated into an output 220 representing a physical address (PA) along with permission information. The PA is used to access physical resources such as the memory 140 described above. The permission information indicates whether a particular type of access (for example, a read access or a write access, is permitted.

Figure 3:
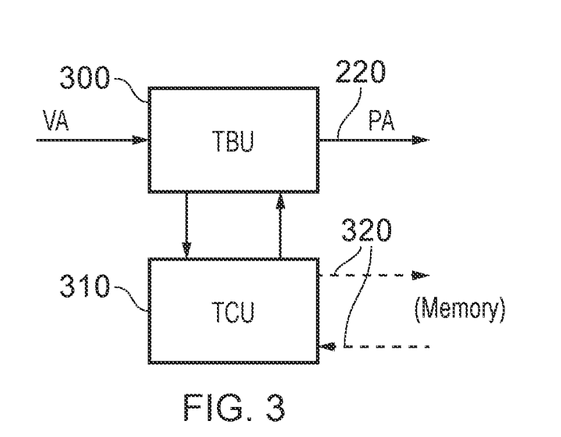

Referring to FIG. 3, an example technique for generating address translations of the type shown in FIG. 2 is to employ, for example, a translation buffer unit (TBU) 300 which may include a cache of translation information, for example in the form of a so-called translation lookaside buffer (TLB) (not shown in FIG. 3). For an input address such as a VA to be translated, if the appropriate translation information is held at the TBU 300, for example in the TLB, then the output PA and permission information can be provided directly from that cached copy. If not, then the TBU 300 needs to be populated by reference to a translation control unit (TCU) 310 which, in at least some examples, accesses so-called page tables held in memory, for example, conducting a so-called page table walk (PTW) process. This can involve repeated accesses 320 to memory, some of which themselves require translations, so the process of obtaining the information this way can be somewhat slower than if a copy is already held at the TBU.

Figure 4:
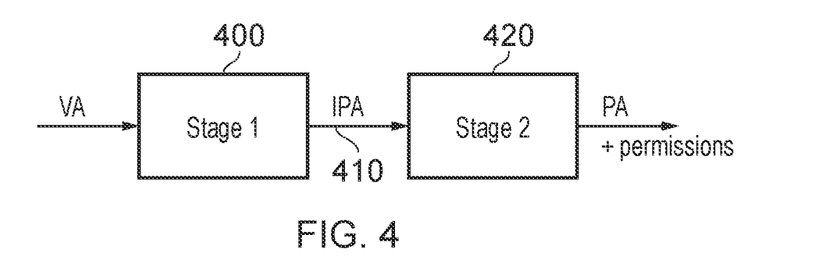

The example described so far relates to a single stage MMU. In contrast, FIG. 4 schematically represents a two-stage MMU in which, at a first stage 400, an input VA is translated to an intermediate physical address (IPA) 410 which is then translated by a second stage 420 into the required PA. Each stage may employ a TBU and/or a TCU for example. Either or both of stage 1 and stage 2 of the MMU of FIG. 4 may contribute to the permission information. In situations where the present techniques are applicable to stage 2 or later of the MMU (for example, in which the first memory address to be discussed below is an IPA), one or more stages earlier in the process than that can be considered as further translation circuitry to generate the first memory address as a translation of a virtual memory address in a virtual memory address space.

Figure 5:
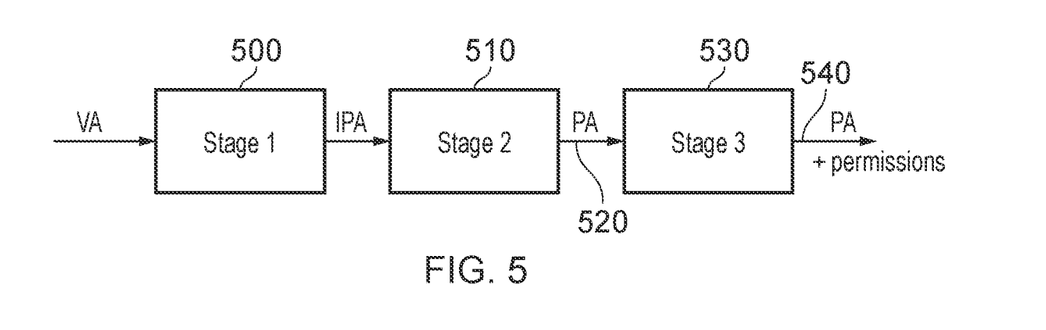

In a further example shown schematically in FIG. 5, three stages are provided. Here, the first 500 and second 510 stages are similar in function to those shown in FIG. 4 in that they result in the generation of a PA 520. The third stage 530 is arranged to apply a predetermined function such as (for example) a so-called identity translation, which is to say that the address 520 is not altered so as to generate the output PA 540, with the only function of the third stage 530 being to obtain the permission information associated with that address, albeit using mechanisms normally associated with a translation process (such as by access to a TBU and/or a TCU). So, although no net translation is performed by the third stage, similar mechanisms to the obtaining of a translation may be used to provide the functionality of the third stage 530.

MMU Circuitry Example

Figure 6:
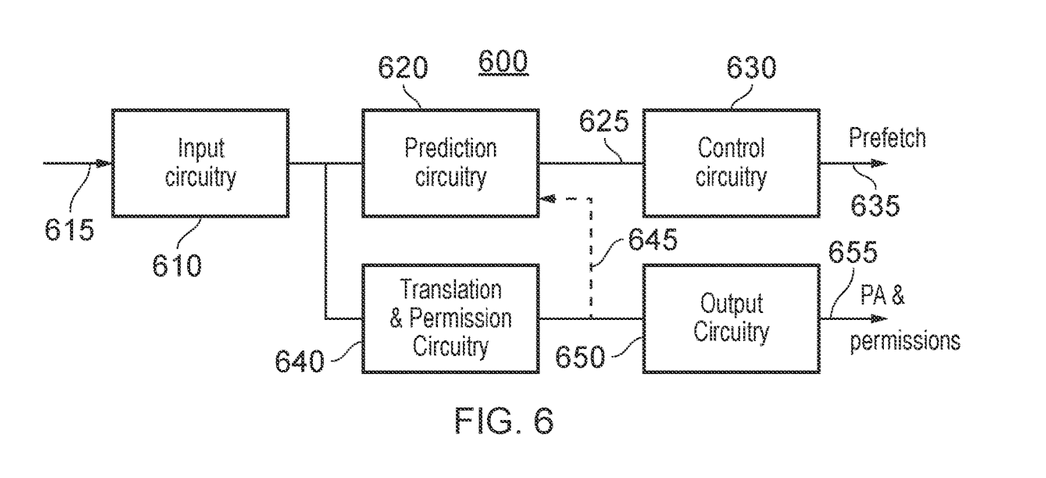
FIG. 6 schematically illustrates an example memory management apparatus.

FIG. 6 provides an example of memory management apparatus 600 comprising input circuitry 610 to receive a translation request 615 defining a first memory address within a first memory address space: prediction circuitry 620 to generate a predicted second memory address within a second memory address space as a predicted translation of the first memory address, the predicted second memory address being a predetermined function of the first memory address. Control circuitry 630 is arranged to initiate processing of the predicted second memory address. In some examples, such as the example shown in FIG. 6, this may involve issuing a prefetch request 635 for handling by the pre-fetcher 160 (so as at least to initiate prefetching); other examples will be discussed below.

Translation and permission circuitry 640 performs an operation to generate a translated second memory address for the first memory address, associated with permission information to indicate whether memory access is permitted to the translated second memory address. The operation may be to access a TBU, TCU, TLB or other circuitry for example.

Output circuitry 650 provides the translated second memory address (for example, a PA) as a response to the translation request 615 when the permission information indicates that access is permitted to the translated second memory address. Note that this does not exclude the outputting of the translated address even when the associated permission information denies the attempted memory access. But in example embodiments, the outputting of the translated address can serve as initiation of a fetch or data retrieval operation at that translated second memory address.

Prediction and Speculation

The arrangement of FIG. 6 allows a predicted version of the address to be used, for example as part of a speculative or early-initiated further processing, an example being the issuing of a prefetch request before the translation and permission circuitry 640 has completed the generation of the definitive output address 655 and permission information. In some situations, this can improve system performance by allowing prefetch operations to take place subject to verification of the translation and the obtaining of permission information by the potentially slower process or operation performed by the translation and permission circuitry 640.

The prediction performed by the prediction circuitry 620 may be according to a predetermined function of the first memory address.

(a) The predetermined mapping or function could be as simple as an identity mapping:

output address=input address (b) Or in other examples, a predetermined offset could be applied between the two addresses so that, for example:

output address=input address+offset (c) Or in other examples, a predetermined shift (such as an m-bit left shift "<<m") could be applied between the two addresses so that, for example:

output address=input address<<1

(d) Or another predetermined function could be used.

The predetermined function can be defined by configuration data or can be pre-programmed or pre-established for the prediction circuitry. In general terms, a predetermined function may be employed (at system design or by configuration under system software control) which is likely to be correct for the translation of at least some first addresses within the first address space in use.

In situations other than an identity mapping (a), mappings which would lead to the use of mapped second addresses (such as PAs) outside of the available and/or valid second address (such as PA address) range can be treated (for example) as translation faults or exceptions or as situations in which the permission information is deemed to indicate "no access".

The translation and permission circuitry can apply a translation defined by translation data, for example in a page table (which can also provide the permission data). Such a translation may define, for at least some first addresses, an identity relationship with the corresponding second address. Or it can apply a predetermined function itself to obtain an address translation. In any case, it may be that at least some translations are performed so that the second address is related to the first address according to a predetermined function (whether or not the translations are obtained from page tables or the like) such that at least some predictions by prediction circuitry using that predetermined function may prove to be correct.

The arrangement of FIG. 6 may be applicable to any one or more stages of an MMU, which itself may be a multi-stage MMU. For example, the one or more stages to which the arrangement of FIG. 6 applies may include a last stage, in which case (as shown schematically in FIG. 6) the further processing initiated by the control circuitry 630 on a speculative basis is the initiation of a prefetch operation and the output by the output circuitry 650 represents the physical address and permission information.

However, in other examples, the prediction could be (for example) a prediction of an IPA, in which case the early or speculative processing initiated by the control circuitry 630 could be the initiation of a further stage of translation (by a later MMU stage) of that IPA into a PA, and similarly, the output by the output circuitry could be the definitive IPA.

While it is not necessary that the operations initiated by the control circuitry 630 are performed early or speculatively, performance advantages can be obtained when the control circuitry 630 is configured to initiate the processing of the predicated second memory address before completion of the operation performed by the translation and permission circuitry 640 for the first memory address.

In summary, reference is made to the following table outlining at least a subset of available options:

| | Type of MMU: | Prediction and speculation applied to: | Nature of processing initiated by control circuitry 630: |
|---|---|---|---|
| Example 1 | single stage | generation of PA from VA | prefetching while definitive PA and permission information obtained |
| Example 2 | multiple stage | generation of PA from VA | prefetching while definitive PA and permission information obtained |
| Example 2 | multiple stage | generation of PA from IPA | prefetching while definitive PA and permission information obtained |
| Example 4 | multiple stage | generation of IPA from VA | translation of IPA to PA while definitive IPA obtained |
| Example 5 | multiple stage | independent application to two or more of the | each of the processes following those to which the prediction technique |
| Example 6 | multiple stage as shown in FIG. 5 | processes leading up to the generation of the eventual PA and permission information stages 2 and 3 | is applied (e.g. IPA→PA and prefetching) prefetching while definitive PA obtained by stage 2 and permission information obtained by stage 3 |

In some respects, the use of speculative processing based on prediction based on the prediction circuitry 620 may be relatively low cost. For example, if the control circuitry 630 is configured to initiate a prefetching operation, then even if the prediction is incorrect, the eventual fetch operation would normally be expected to be no slower than if the speculative prefetching had not been used, and can be faster if the speculation is correct. In this case, the main penalty for the speculative operation proving incorrect would be a power consumption penalty rather than a processing performance penalty. However, in other situations (for example if the control circuitry were to initiate a different operation) there could be a higher or different penalty for an incorrect prediction.

Therefore with these features in mind, various options are available for the control of the prediction circuitry 620.

In a first option, prediction is performed for every first memory address 615 received by the input circuitry 610, and the control circuitry 630 is configured to initiate processing of the predicted of the second memory address in all cases.

Figure 7:
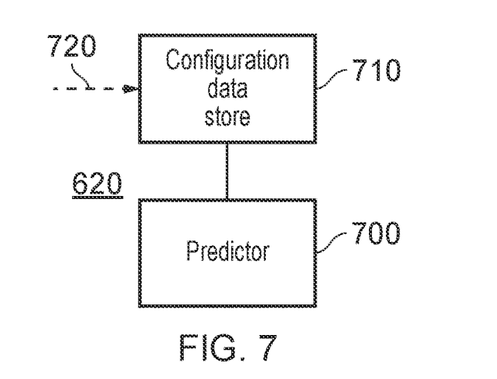
FIGS. 7 and 8 schematically illustrate respective examples of prediction circuitry.

In a second option, shown schematically in FIG. 7, the prediction circuitry 620 comprises a predictor 700 which is responsive to configuration data stored in a configuration data store 710, which may be as simple as a register associated with the predictor 700 to indicate "predict/do not predict" and/or a register or other store to indicate or otherwise specify the predetermined function (for example from a predetermined set of candidate functions) and which may be written to 720 by system software, an operating system, a hypervisor (software overseeing at least some aspects of security for multiple operating systems) or the like. When the configuration data has been set to indicate that prediction should be used, the predictor 700 performs the prediction discussed above. Otherwise it does not. The control circuitry 630 acts on a prediction 625 generated by the prediction circuitry 620 if one is provided.

Figure 8:
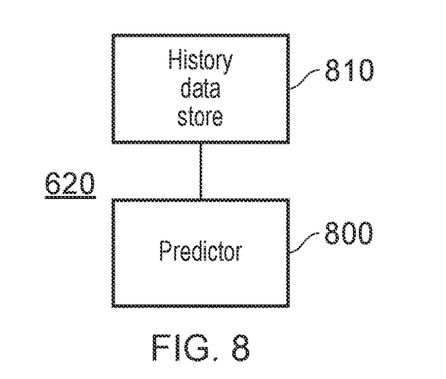

In another option shown schematically in FIG. 8, a predictor 800 is responsive to history data stored in a history data store 810 (as an example of a history memory). Here, the history data may represent the outcome of previous predictions, in that it may represent whether one or more previous predicted second memory addresses were equal to the respective translated second memory addresses. This may require a comparison of the output of the translation and permission secondary circuitry 640, for example by a schematic path 645 back to the prediction circuitry 620, with the corresponding prediction made by the prediction circuitry 620.

In some examples, the history data can be stored simply for previous translations. In other examples, the history data can be stored according to translation "context" such as application space or virtual machine identifier (ASIDN-MID), with history data relating to the current or prevailing context being used in the assessment of whether prediction should be used.

In some examples, the history data may record, for example, up to a predetermined number n of instances of data indicating the outcome (correct or incorrect) of the n most recently predicted translations (or in a context-based system the n most recent for each context as stored). Up to another predetermined number n2 of different contexts may be stored by the history data.

In other examples, the history data may record, for example, up to a predetermined number n of instances of data indicating the outcome (whether or not a fetch followed the speculative prefetch at the same translated address) of the n most recently predicted translations (or in a context-based system the n most recent for each context as stored). This takes into account not only whether the predicted translation was correct but also whether the (implied) prediction of the permission information allowing the access was also correct.

The assessment of whether or not to employ prediction can be, for example, on a majority basis (for example was the prediction appropriate for at least a majority of those instances stored?). In other examples a multi-bit state machine arrangement similar to a branch prediction technique can be used, so that the history data controls the transition between plural states, for example:

strongly predict, weakly predict, weakly non-predict, strongly non-predict

Transitions between states are made according to the history data and are allowed only between adjacent states in the list above. In some examples, a transition rightwards in the list is performed, for example, in response to a low number of previously predicted outcomes being correct (for example, fewer than a first threshold number), and a transition leftwards in the list is performed, for example, in response to a high number of previously predicted outcomes being correct (for example, more than a second threshold number). Prediction is used if the current state (which may be by context as above) is either "strongly predict" or "weakly predict".

MMU and Prefetching Operations

Figure 9:
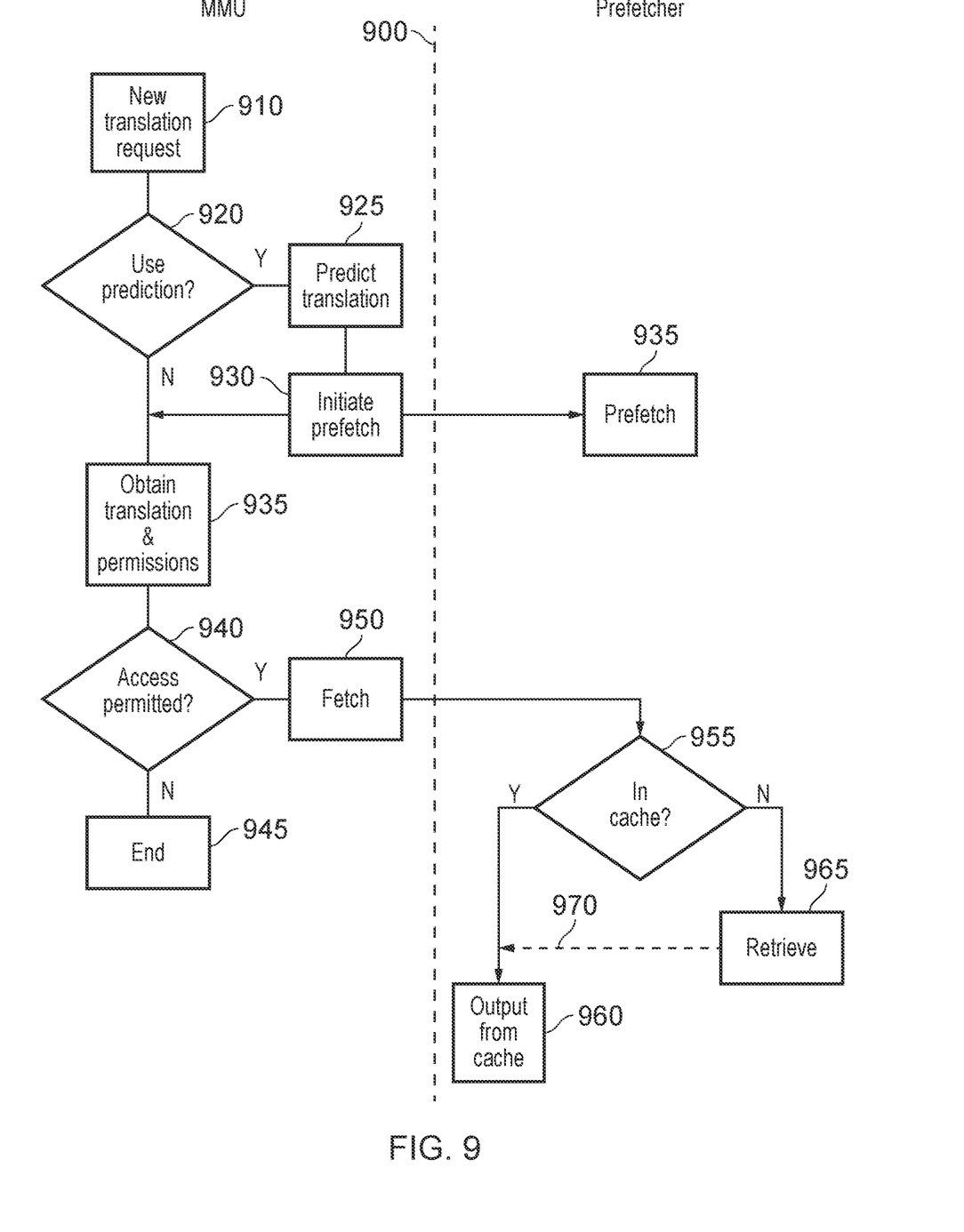
FIGS. 9 to 12 are schematic flowcharts illustrating respective methods.

FIG. 9 is a schematic flowchart illustrating some of the techniques described above.

In FIG. 9, operations to the left of vertical broken line 900 relate to aspects of the operation of the MMU 110, and operations to the right of the line 900 represent operations of the prefetcher 160. While the MMU could be a single stage MMU, in other examples the techniques described here could relate to one or more stages of a multi-stage MMU. In the examples shown in FIG. 9, the techniques described here may relate to at least one stage (in this example at least the last stage) of the MMU, in that it is assumed that a new translation request 910 relates either to an incoming VA or to the output of a preceding further MMU stage such as a first stage as discussed above.

The example of FIG. 9 also assumes that the operation speculatively initiated by the control circuitry 630 is a prefetched operation relating to a predicted output PA. However, as discussed above, depending on the MMU stage under consideration, such an operation could be a different operation.

In response to the new translation request 910, a step 920 detects whether prediction should be used. As mentioned above, various options are available, and assuming that the arrangements of either FIG. 7 or FIG. 8 are in use, a decision is made by the prediction circuitry 620 as to whether the prediction should be used. If the answer is yes, then the prediction circuitry 620 predicts a translation at a step 925 and the control circuitry 930 initiates a prefetch operation at a step 930. In response to this, the prefetcher 160 prefetches the required data at a step 935.

For the negative outcome of the step 920, or following the step 930, control passes to a step 935 at which the translation and permission circuitry 640 obtains the required translation and permission information. Note that although this is shown following the step 930, the operations of the translation and permission circuitry 640 can be commenced in parallel with either or both of the steps 925, 930.

(In terms of timing, in example embodiments, potential performance improvements can be obtained by initiating the action based on the predicted translation before completion of the operation to obtain the definitive translation. However, this is not a requirement).

Based on the outcome of the step 935, a step 940 detects whether the required access is permitted to the translated memory address. If the answer is no then the process ends 945. If the answer is yes then the MMU initiates a fetch or data retrieval operation at a step 950. In response, the prefetcher detects at a step 955 whether the required data is currently held in the data store or cache 170. If the answer is yes then at a step 960 the data is output from the cache 170. If the answer is no then the required data is retrieved at a step 965 from the memory 140. As discussed below, it may even be written to the cache and then output from the cache at the step 960 or it may be output directly from the prefetcher without writing to the cache. For this reason, a routing line 970 is shown in broken line to illustrate that it is optional.

In the situation that a prefetch operation is performed on the basis of a predicted translation, but the definitive permission information indicates that the relevant access is not in fact permitted, no subsequent fetch or data retrieval operation will be initiated, so that the prefetched data will never in fact be output from the cache 170.

Example Prefetch and Subsequent Fetch Operations

Figure 10:
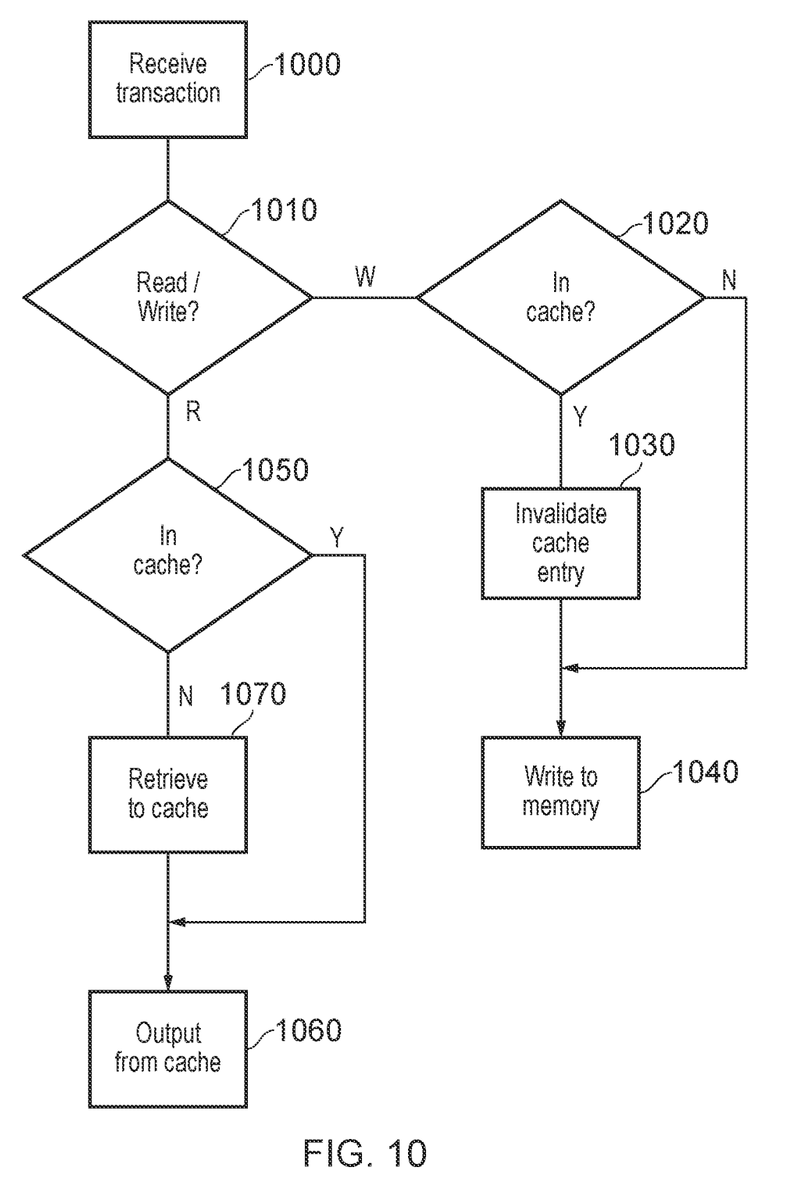

FIG. 10 schematically illustrates some example operations relating to the prefetcher 160 in response to a data retrieval operation or transaction received at a step 1000.

At a step 1010, a detection is made as to whether a transaction is a read or a write transaction. If a write transaction, then if (at a step 1020) the data at the required address is held in the data store 170, then that entry is invalidated at step 1030 and (either following the step 1030 or has been negative outcome of the step 1020) at a step 1040 the required data is written to a memory 140. Note that the system may handle write transactions by any one or more of:

not initiating a prediction of a translation predicting a translation and in response, taking some steps (not including a prefetch) to initiate a write operation predicting a translation and (for the sake of uniformity of process) initiating a pref etch operation (even though the prefetched data will not in fact be needed to execute the write transaction)

Note that in the situation that the predicted translation is used in a subsequent MMU stage (for example, to start a speculative next-stage translation or the speculative obtaining of permission information) rather than to initiate pref etching, then these actions are relevant to read and to write transactions and so the same process can be followed in response to the prediction irrespective of the type of transaction.

For a read transaction, if (at a step 1050) the required data is already held in the cache then it is output in a step 1060 from the cache (the prefetch circuitry providing the prefetched data from the data store as a response to the data retrieval operation). If not, it is retrieved to the cache at a step 1070 and then output at the step 1060.

Figure 11:
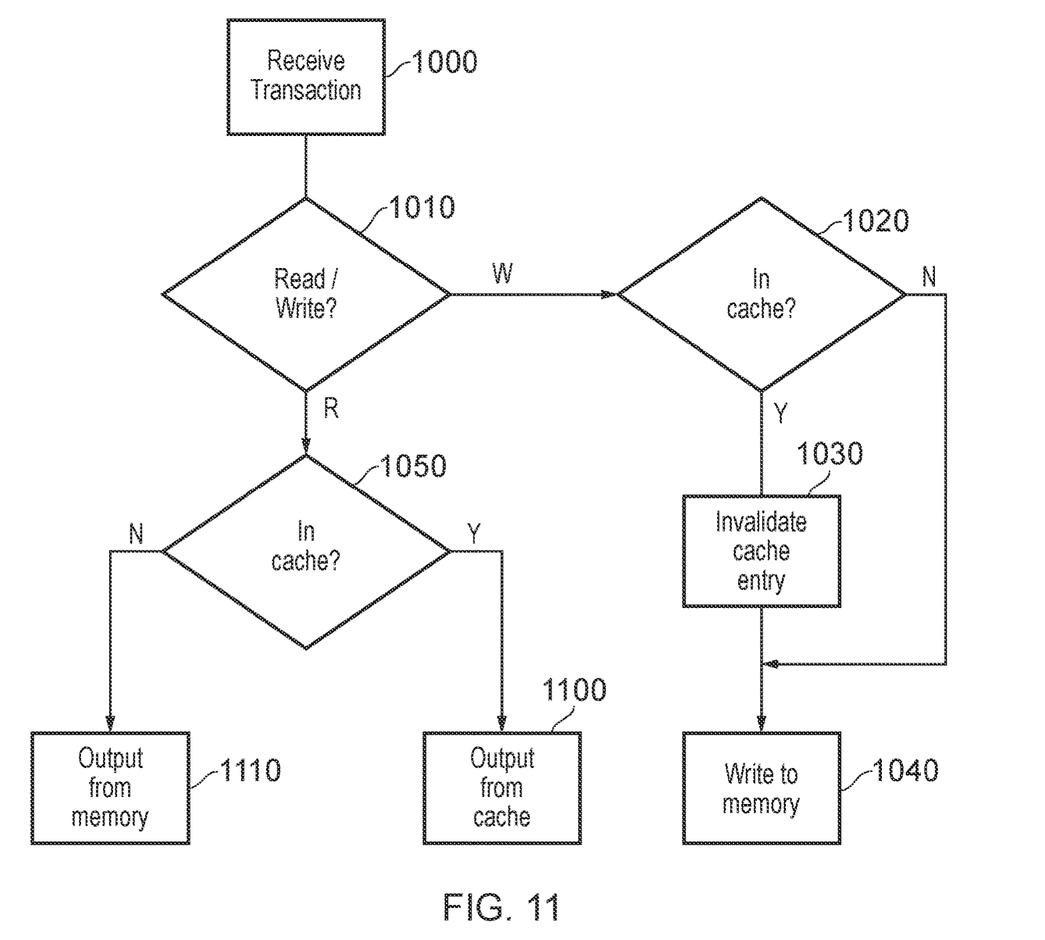

FIG. 11 shows an almost identical arrangement and features in common will not be described again. A substantive difference from FIG. 10 is that instead of the required data being always routed via the cache, if it is in the cache it is output from the cache at a step 1100, but if it is not already in the cache at the step 1050, it is obtained and output directly from memory at a step 1110. In this example, when the data retrieval operation is initiated before completion of a prefetch operation, the prefetch circuitry is configured not to store the retrieved data in the data store.

Alternative Example—Operations Involving Other Caches

Cache memories may be provided at various locations within systems such as that shown in FIG. 1 having requester devices (such as the requesters 100, 120, 130), slave devices such as the memory 140 to service requests, and optionally one or more interconnects such as the interconnect 150. For example, the interconnect 150 may comprise or be associated with one or more cache memories 154 (FIG. 1). In a coherent system (such as an example system to be discussed below) one or more cache memories may be associated with a coherency controller 152 (FIG. 1).

In some example embodiments, instead of a prefetch operation being performed by the prefetcher 160 to store prefetched data into a data store or cache memory 170 associated with the prefetcher, an alternative arrangement is for such a prefetch operation to cause a read into an existing cache memory such as the cache memory 154, where the term "existing" simply implies that the particular cache memory has one or more other uses within the system in addition to its use by the prefetcher. In other words, in such an alternative arrangement the data store 170 specifically associated with the prefetcher 160 is not required. Therefore, the "data store associated with the prefetch circuitry" can be implemented by a data store used only in respect of prefetch operations as defined here, or by a data store used for prefetch operations and for other potential operations within the system. In the latter case the data store can be a cache memory operating according to otherwise previously proposed techniques including any of the example eviction policies discussed above.

Therefore, the cache memory 154 or the cache memory 170 can represent an example of a data store associated with the prefetch circuitry, in which the data store is configured to store data prefetched by the prefetch circuitry. Subsequent accesses (in response to the definitive translation and permission information as discussed above) would then have the opportunity to benefit from the data loaded into the cache according to previously proposed techniques.

Coherency

In a system having multiple nodes capable of holding copies of stored information, in the case of a data handling access by one node to such information there can be a need to ensure that the accessing node is accessing the latest version of the stored information, and that if it makes any alteration to the stored information, either the other versions are correctly altered themselves or the other versions are deleted or invalidated. In general terms, such a "coherent" system may be implemented according to the overall schematic representation of FIG. 1, in that at least the various requesters and the interconnect may have associated cache memories, and further copies may be held at the memory 140 and the prefetcher cache 170

To handle this situation, the coherency controller 152 may be provided, for example at the interconnect 150, to control the storage and retrieval of information so that data written to a memory address in the coherent memory circuitry by one processing element is consistent with data read from that memory address in the coherent memory circuitry by another of the processing elements.

The role of logic associated with the coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then cache coherence logic avoids conflicts with other existing copies of the data item. Techniques for achieving this can include (for example) the use of a so-called "snoop filter". Here, the term "snoop filter" is a historical one and is used here to refer to a control device forming part of the coherency controller 152 having an associated "directory", where the directory stores information indicating which data is stored in which cache, and the snoop filter itself at least contributes to the handling of data accesses to cached information so as to provide a cache coherence function.

The coherency controller 152 handles at least a part of a process under which, when any of the requesters 100, 120, 130 intends to access or modify data which is stored as a cache line in any of the cache memories, that node obtains permission to do so.

These aspects of coherent operations are well established and will not be described further here, other than to refer to the operations described above with respect to the step 1030 which may be performed, under the control of the coherency controller 152, to ensure that at processing stages which are potentially significant to the coherency control process, multiple potentially incorrect copies of a data item are not retained.

Summary of Apparatus Features

The apparatus of FIG. 1 provides an example of data processing apparatus comprising:

one or more memories 140 accessible according to physical memory addresses;

one or more data processing nodes 100 to generate translation requests from a virtual memory address generated by that data processing node to a physical memory address to access the one or more memories;

memory management apparatus 110 as discussed above to translate a virtual address from a data processing node to a physical address to access the one or more memories; and prefetch circuitry 160, 170 to prefetch data from the one or more memories in response to initiation of prefetching by the control circuitry.

Summary Method

Figure 12:
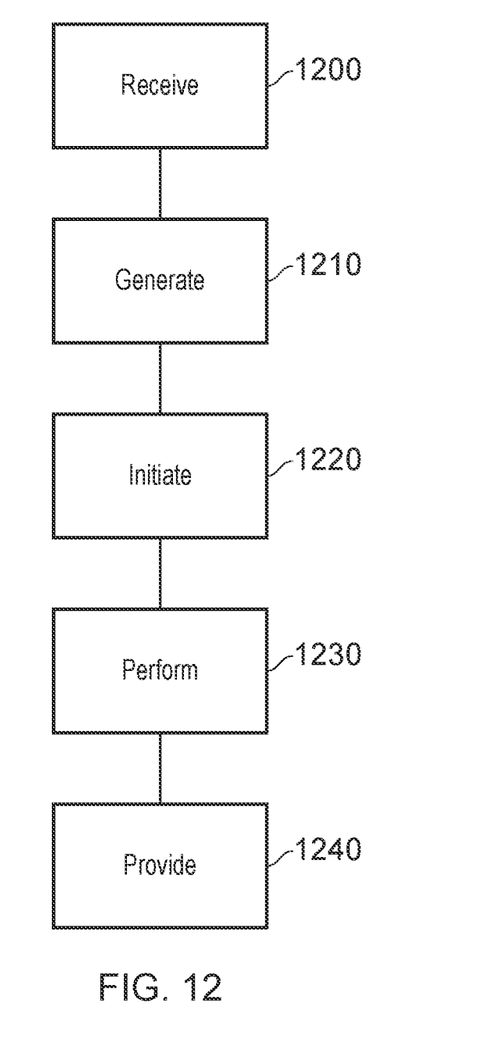

FIG. 12 is a schematic flowchart illustrating a method (which can be performed, for example, by the apparatus of FIG. 1 and/or FIG. 6) comprising:

receiving (at a step 1200) a translation request defining a first memory address within a first memory address space;

generating (at a step 1210) a predicted second memory address within a second memory address space as a predicted translation of the first memory address, the predicted second memory address being a predetermined function of the first memory address;

initiating (at a step 1220) processing of the predicted second memory address;

performing (at a step 1230) an operation to generate a translated second memory address for the first memory address associated with permission information to indicate whether memory access is permitted to the translated second memory address; and providing (at a step 1240) the translated second memory address as a response to the translation request when the permission information indicates that access is permitted to the translated second memory address.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A memory management apparatus comprising:
input circuitry to receive a translation request defining a first memory address within a first memory address space;
prediction circuitry to generate a predicted second memory address within a second memory address space as a predicted translation of the first memory address, the predicted second memory address being a predetermined function of the first memory address;
control circuitry to initiate processing of the predicted second memory address;
translation and permission circuitry to perform an operation to generate a translated second memory address for the first memory address associated with permission information to indicate whether memory access is permitted to the translated second memory address; and
output circuitry to provide the translated second memory address as a response to the translation request when the permission information indicates that access is permitted to the translated second memory address,
wherein the control circuitry is configured to initiate prefetching of data at the predicted second memory address before completion of the operation performed by the translation and permission circuitry for the first memory address, and
wherein the prefetch circuitry is configured to deny access to the data at the predicted second memory address responsive to the permission information indicating denial of access.

2. The memory management apparatus of claim 1, in which:
the apparatus comprises one or more successive address translation stages; and
the translation and permission circuitry provides at least one of the one or more successive translation stages.

3. The memory management apparatus of claim 2, in which:
the translation and permission circuitry provides at least a last stage of the one or more successive address translation stages; and
the translated second memory address represents a physical memory address.

4. The memory management apparatus of claim 3, in which:
the apparatus comprises further translation circuitry to generate the first memory address as a translation of a virtual memory address in a virtual memory address space.

5. The memory management apparatus of claim 1, in which the first memory address is one of an intermediate physical address and a virtual memory address.

6. The memory management apparatus of claim 1, in which the predetermined function is such that the predicted second memory address is equal to the first memory address.

7. The memory management apparatus of claim 1, in which the prediction circuitry comprises circuitry to apply the predetermined function to each first memory address to generate a corresponding predicted second memory address.

8. The memory management apparatus of claim 1, in which the prediction circuitry is configured to generate the predicted second memory address as the predetermined function of the first memory address in dependence on whether one or more previous predicted second memory addresses were equal to the respective translated second memory addresses.

9. The memory management apparatus of claim 8, in which the prediction circuitry is configured to generate the predicted second memory address as the predetermined function of the first memory address in dependence on whether one or more previous predicted second memory addresses were equal to the respective translated second memory addresses for a current translation context.

10. The memory management apparatus of claim 8, in which the prediction circuitry comprises a history memory to store data indicating, for one or more previous predicted second memory addresses, whether those one or more previous predicted second memory addresses were equal to the respective translated second memory addresses.

11. The memory management apparatus of claim 1, in which the prediction circuitry is responsive to configuration data to selectively apply the predetermined function to first memory addresses to generate a corresponding predicted second memory address.

12. Data processing apparatus comprising:
one or more memories accessible according to physical memory addresses;
one or more data processing nodes to generate translation requests from a virtual memory address generated by that data processing node to a physical memory address to access the one or more memories;
memory management apparatus to translate a virtual address from a data processing node to a physical address to access the one or more memories, the memory management apparatus comprising:
input circuitry to receive a translation request defining a first memory address within a first memory address space;
prediction circuitry to generate a predicted second memory address within a second memory address space as a predicted translation of the first memory address, the predicted second memory address being a predetermined function of the first memory address;

control circuitry to initiate processing of the predicted second memory address;

translation and permission circuitry to perform an operation to generate a translated second memory address for the first memory address associated with permission information to indicate whether memory access is permitted to the translated second memory address; and output circuitry to provide the translated second memory address as a response to the translation request when the permission information indicates that access is permitted to the translated second memory address, wherein the control circuitry is configured to initiate prefetching of data at the predicted second memory address before completion of the operation performed by the translation and permission circuitry for the first memory address; and prefetch circuitry to prefetch data from the one or more memories in response to initiation of prefetching by the control circuitry and to deny access to the data at the predicted second memory address in response to the permission information indicating denial of access.

13. The data processing apparatus of claim 12, comprising a data store associated with the prefetch circuitry, in which:

the data store is configured to store data prefetched by the prefetch circuitry;

the output circuitry is configured to initiate a data retrieval operation at the translated second memory address; and the prefetch circuitry is configured to provide the prefetched data from the data store as a response to the data retrieval operation.

14. The data processing apparatus of claim 13, in which the prefetch circuitry is configured to invalidate a copy of data stored in the data store for a given second memory address in response to initiation of an operation to write to the given second memory address.

15. The data processing apparatus of claim 13, in which, when the data retrieval operation is initiated before completion of a prefetch operation, the prefetch circuitry is configured not to store the retrieved data in the data store.

16. The data processing apparatus of claim 13, in which the prefetch circuitry is configured to evict from the data store any data retrieved from the data store in response to a data retrieval operation.

17. A method comprising:

receiving a translation request defining a first memory address within a first memory address space;

generating a predicted second memory address within a second memory address space as a predicted translation of the first memory address, the predicted second memory address being a predetermined function of the first memory address;

initiating processing of the predicted second memory address;

performing an operation to generate a translated second memory address for the first memory address associated with permission information to indicate whether memory access is permitted to the translated second memory address;

providing the translated second memory address as a response to the translation request when the permission information indicates that access is permitted to the translated second memory address; and initiating prefetching of data at the predicted second memory address before completion of the operation for the first memory address, in response to the permission information indicating denial of access to the data at the predicted second memory address, preventing prefetching of the data at the predicted second memory address.

\* \* \* \* \*